United States Patent

Huilgol

(10) Patent No.: US 6,801,762 B1
(45) Date of Patent: Oct. 5, 2004

(54) APPARATUS, AND ASSOCIATED METHOD, FOR PLACING AN EMERGENCY CALL IN A RADIO COMMUNICATION SYSTEM

(75) Inventor: Sharad Huilgol, San Diego, CA (US)

(73) Assignee: Nokia Corporation, Espoo (FI)

( * ) Notice: Subject to any disclaimer, the term of this patent is extended or adjusted under 35 U.S.C. 154(b) by 251 days.

(21) Appl. No.: 09/672,756

(22) Filed: Sep. 28, 2000

Related U.S. Application Data

(60) Provisional application No. 60/156,558, filed on Sep. 29, 1999.

(51) Int. Cl.$^7$ .............................................. H04M 11/00
(52) U.S. Cl. ................................ 455/404.1; 455/552.1; 455/553.1
(58) Field of Search ................................. 455/404, 552, 455/553, 403, 404.1, 435.1, 445, 450, 418, 414.1, 550.1, 552.1, 553.1

(56) References Cited

U.S. PATENT DOCUMENTS

| 5,442,806 A | 8/1995 | Barber et al. ............... 455/33.1 |
| 5,864,755 A | 1/1999 | King et al. .................. 455/404 |
| 5,890,061 A | * 3/1999 | Timm et al. ................. 455/404 |
| 6,115,599 A | * 9/2000 | Stilp ........................... 455/404 |
| 6,125,283 A | * 9/2000 | Kolev et al. ................. 455/552 |
| 6,456,858 B1 | * 9/2002 | Streter ......................... 455/552 |

FOREIGN PATENT DOCUMENTS

| EP | 0 789 498 A2 | 8/1997 | |
| WO | WO 92/16077 | 9/1992 | |
| WO | WO 9216077 A1 | * 9/1992 | ............ H04B/1/44 |

* cited by examiner

*Primary Examiner*—Nay Maung
*Assistant Examiner*—Edan Orgad

(57) ABSTRACT

Apparatus, and an associated method, for facilitating placement of an emergency call utilizing a mobile station operable selectably in more than one communication system. If the emergency call cannot be completed by way of a first of the communication systems, selection is made to attempt to complete the call by way of an alternate communication system. Thereby, the likelihood that an emergency call might not be able to be completed is reduced.

16 Claims, 3 Drawing Sheets

APPARATUS, AND ASSOCIATED METHOD, FOR PLACING AN EMERGENCY CALL IN A RADIO COMMUNICATION SYSTEM

CROSS-REFERENCE TO RELATED APPLICATION

The present application claims the priority of the provisional patent application, or appreciation Ser. No. 60/156,558, filed on Sep. 29, 1999.

The present invention relates generally to a manner by which to place an emergency call utilizing a radio communication system, such as mobile station operable in a cellular communication system. More particularly, the present invention relates to apparatus, and an associated method, by which selectably to place an emergency call by way of any communication system in which a mobile station is operable. If the emergency call is unable to be completed by way of one of the communication systems, attempts are made to place the call by way of another communication system in which the mobile station is operable. The possibility that an emergency call might not be able to be completed due, e.g., to system congestion, or other communication difficulty, is reduced through operation of an embodiment of the present invention as use of alternative communication systems to place the call is permitted.

BACKGROUND OF THE INVENTION

A communication system is formed, at a minimum, of a sending station and a receiving station interconnected by way of a communication channel. Information to be communicated by the sending station to the receiving station is converted into a form to permit its communication upon the communication channel, thereafter to be received at the receiving station.

A radio communication system is a type of communication system in which the communication channel is formed of a radio link formed between the sending and receiving stations. The radio link is defined upon a portion of the electromagnetic spectrum. In contrast, conventional wireline communication systems require a wired connection between the sending and receiving stations upon which to form a communication channel therebetween. Because radio links are utilized in a radio communication system, the need for conventional wireline connections between the sending and receiving stations in a conventional wireline communication system are obviated. A radio communication system, therefore, inherently permits increased communication mobility in contrast to conventional wireline systems. That is to say, radio communication systems can be utilized to effectuate communications therethrough in situations in which use of a conventional wireline communication system would be impractical.

A radio communication system, however, typically, is bandwidth-limited. Regulatory bodies which allocate usage of the electromagnetic spectrum allocate only a limited amount of the electromagnetic spectrum for communications in a particular radio communication system. Because the spectrum allocation for use by a particular system is limited, communication capacity increase of a radio communication system is limited by such allocation. Efforts are made, therefore, to construct a radio communication system in manners which efficiently utilize the allocated spectrum.

A cellular communication system is exemplary of a radio communication system. Mobile communication systems make relatively efficient use of the spectrum allocated thereto. Signals generated during operation of the mobile communication system are of relatively low power levels. Because of the use of low-power signals, the same channels can be reused throughout a mobile communication system according to a cell reuse plan. Concurrent use of the same channels is permitted according to the cell reuse plan, thereby to effectuate concurrent communications on the same channels by different communication station pairs at different locations throughout the area encompassed by the mobile communication system.

Generally, first-generation, cellular communication systems utilize analog communication techniques, such as FDM (Frequency Duplex Multiplexing) techniques. Even utilizing cell reuse plans, however, such cellular communication systems are sometimes utilized at maximum capacities, particularly at certain-times-of-day and within certain cells of the communication systems.

Digital communication techniques have been utilized in various so-called, second-generation, cellular communication systems. Through the use of digital communication techniques, more efficient utilization of the bandwidth allocated to the communication system is possible, thereby permitting an increase in the communication capacity of the communication system.

Such communication systems, in many instances, have been overlayed upon existing communication systems. That is to say, in a geographical area in which one cellular communication system is already installed, another communication system is also installed to encompass the same, or similar, geographical area. Mobile stations have been constructed to permit their operation in a selected system of two or more of such communication systems. Such mobile stations are sometimes referred to as being multi-mode mobile stations.

While a mobile station is utilized by a user for any of many varied communication purposes, use of a mobile station is perhaps of greatest benefit in the event of an emergency situation. In an emergency situation, the mobile station can be utilized by the user to request emergency assistance. In many parts of the United States, for instance, the digits 9-1-1 are associated with an emergency dispatch station. By entering such digits, the user of the mobile station is generally capable of soliciting a request for emergency assistance.

However, to complete the request for emergency assistance, bandwidth must be available to complete the call. Situations may develop in which communication capacity in one system prevents the completion of the emergency call. If the mobile station is operable in more than one communication system, if a manner could be provided by which to permit the emergency call to be placed pursuant to alternative communication systems, an increased probability that the emergency call can be successfully completed would result.

It is in light of this background information related to operation of a mobile station to place an emergency call that the significant improvements of the present invention have evolved.

SUMMARY OF THE INVENTION

The present invention, accordingly, advantageously provides apparatus, and an associated method, by which to place an emergency call utilizing a radio communication system such as by utilizing a mobile station operable in a cellular communication system.

Through operation of an embodiment of the present invention, a manner is provided by which selectably to place an emergency call by way of any communication system in which the mobile station is operable. When the mobile station is operable in more than one communication system, if the emergency call is unable to be completed by way of one of the communication systems, attempts are made to place the call by way of another communication system.

By increasing the number of communication systems in which an emergency call can be placed, the possibility of an emergency call might not be able to be completed is reduced. System congestion, or other communication difficulties in one communication system might well not be replicated in another of the communication systems. Thereby, the emergency call can be completed in the alternate communication system.

In one aspect of the present invention, a mobile station is selectably operable in at least two radio communication systems, such as a cellular communication system operated by a first operator and a cellular communication system operated by a second operator. One of the communication systems forms a presently-acquired communication system in which the mobile station is registered to be operable. When the user of the mobile station initiates an emergency call, the mobile station is operable first to attempt to complete the call by way of the presently-acquired communication system. If the call can be completed, conventional operation of the mobile station is effectuated. If, conversely, the call cannot be completed utilizing the presently-acquired communication system, through operation of an embodiment of the present invention, the call is attempted by way of another communication system, such as the cellular communication system operated by another operator. By providing the opportunity alternately to place the emergency call by way of the other communication system, the possibility that the emergency call shall not be able to be completed is reduced.

In another aspect of the present invention, a determination is made as to whether the emergency call is completed. If a determination is made that the emergency call has not been completed, that is to say, a connection between the mobile station and the emergency station associated with the emergency call is not completed, a decision is made as to whether to reattempt to complete the emergency call pursuant to the presently-acquired communication system. A decision is made, for instance, to reattempt to place the emergency call pursuant to the presently-acquired communication station a selected number of times. If a decision is made not to reattempt to complete the emergency call pursuant to the presently-acquired communication system, an attempt, instead, is made to complete the emergency call upon a channel of another communication system.

In another aspect of the present invention, a decision to reattempt to complete the emergency call by way of one of the communication systems is dependent upon the time period permitted within which to place the emergency call. If the time period has expired, the decision is made to utilize a channel of another communication system by which to attempt to complete the emergency call.

In another aspect of the present invention, a mobile station is operable selectably in at least three communication systems, such as a cellular communication system operated by a first operator, a second cellular communication system operated by a second operator, and PCS (Personal Communication Service) communication system. If, when an emergency call placed pursuant to a presently-acquired communication system cannot be effectuated and, thereafter, the emergency call can also not be placed by way of a first alternate communication system, an attempt is thereafter made to place the emergency call by way of a second alternative communication system. Thereby, the likelihood that an emergency call cannot be completed by way of the mobile station is further reduced.

In these and other aspects, therefore, apparatus, and an associated method, is provided for facilitating completion of an emergency call placed at a mobile station. The mobile station is operable in a first radio communication system in which a first set of channels is utilized in placement of the emergency call. And, the mobile station is operable in at least a second radio communication system in which at least a second set of channels is utilized in placement of the emergency call. A preferred list of channels is selected from at least one of the first set and the second set utilized by the mobile station first to attempt the completion of the emergency call. A selector is coupled to receive indications of non-successful completion of the emergency call through utilization of the preferred list of channels. The selector is operable responsive thereto to select at least one additional channel to be utilized by the mobile station to attempt the completion of the emergency call. The at least one additional channel is selected from the first set and the second set and is not contained in the preferred list of channels.

A more complete appreciation of the present invention and the scope thereof can be obtained from the accompanying drawings which are briefly summarized below, the following detailed description of the presently-preferred embodiment of the present invention, and the appended claims.

DETAILED DESCRIPTION OF THE PREFERRED EMBODIMENT

Figure 1:
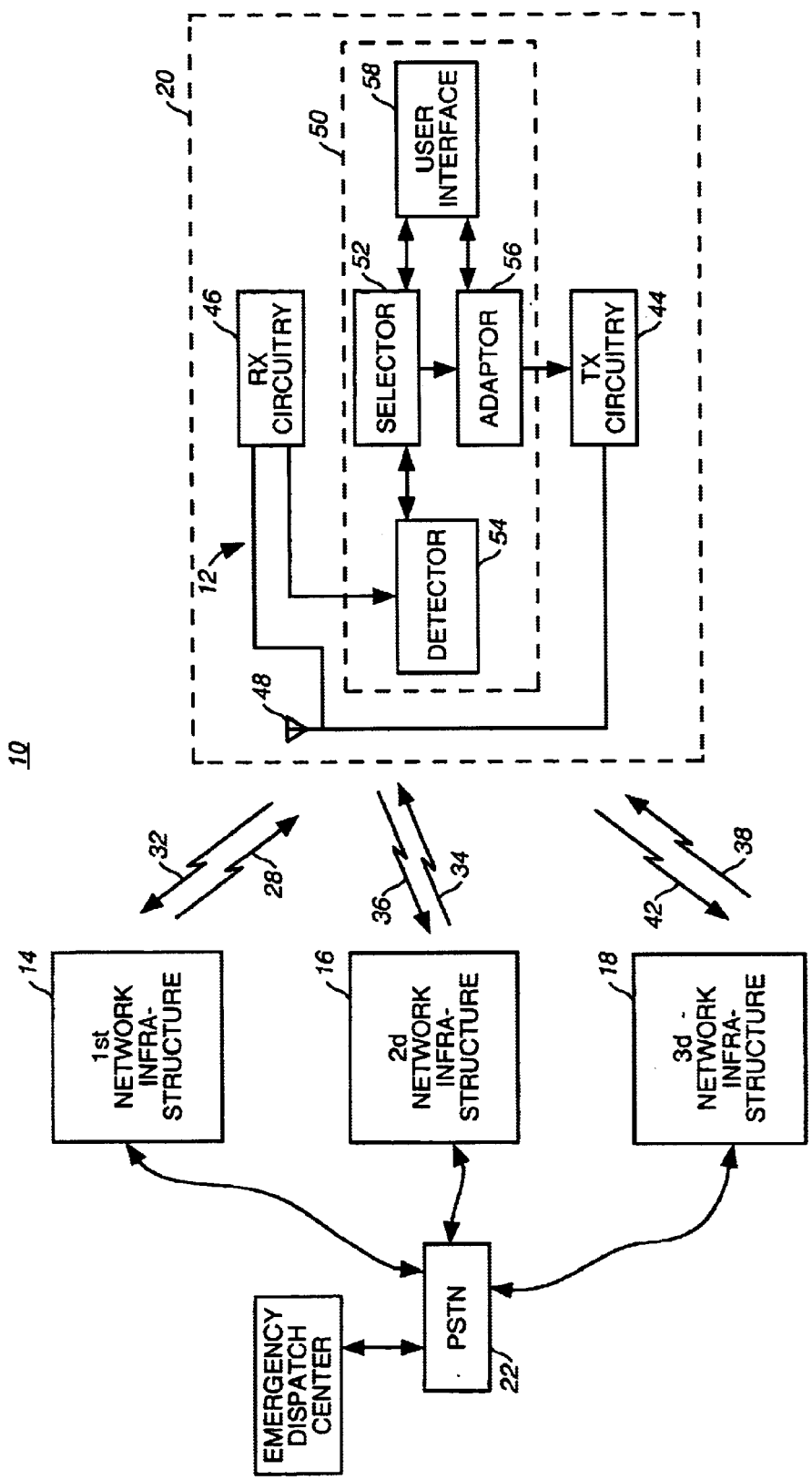
FIG. 1 illustrates a functional block diagram of a mobile station operable pursuant to an embodiment of the present invention positioned in a geographical area encompassed by a plurality of radio communication systems.

Referring first to FIG. 1, a communication arrangement, shown generally at 10, includes a multi-mode mobile station 12 capable of transceiving communication signals pursuant to a plurality of radio communication systems. In the exemplary implementation, the mobile station 12 forms a dual-band, tri-mode, cellular mobile station selectably operable in three separate mobile communication systems. While the following description shall describe the mobile station 12 with respect to such an implementation, it should be understood that other embodiments of the present invention can analogously be implemented to be operable in other types of arrangements and systems.

Here, the mobile station is selectably operable to communicate by way of a first network infrastructure 14, a second network infrastructure 16, and a third network infrastructure 18. The network infrastructures 14–18 are installed and are permitting of radio communications with the mobile station 12 when the mobile station is positioned in a geographical area encompassed by the network infrastructure of the respective communication systems. The mobile station 12 is here shown to be positioned within a cell 20 which is here representative of cells defined by any of the three separate infrastructures 14–18. The separate network infrastructures, and the cells defined therein, may be overlayed, or partially overlayed, upon one another.

The network infrastructure 14 is here, for purposes of example, representative of a PCS-band, CDMA (Code Division, Multiple-Access) mobile communication system operable at approximately 1.9 GHz. The network infrastructure 16 is here, also for purposes of example, representative of a cellular-band, FDMA (Frequency Division, Multiple-Access) mobile communication system operable at about 800 MHz, operated by a selected operator. And, the network infrastructure 18 is, also for purposes of example, representative of the network infrastructure of another cellular-band, FDMA (Frequency Division, Multiple-Access) mobile communication system operable at about 800 MHz, here by another selected operator. The network infrastructures 16 and 18, for instance, form AMPS (Advanced Mobile Phone Service) systems operated by separate operators, sometimes referred to as operators A and B.

The network infrastructures 14–18 of the respective communication systems are coupled to a PSTN (Public-Switched, Telephonic Network) 22, in conventional manner. An emergency dispatch center 24 is shown to be coupled to the PSTN. The emergency dispatch center 24 is representative of a location at which requests for emergency assistance are routed. The emergency dispatch center is representative, for instance, of the location to which emergency 9-1-1 calls are routed by a caller, in the United States, requesting emergency assistance.

During operation of the first communication system, of which the first network infrastructure forms a portion, communication signals are transceived between the network infrastructure 14 and the mobile station. Here, first downlink communication signals 28 and first uplink communication signals 32 are representative of signals communicated between the network infrastructure 14 and the mobile station. Analogously, operation of the communication system of which the second network infrastructure 16 forms a portion, communication signals are transceived between the network infrastructure 16 and the mobile station. Here, second downlink communication signals 34 and second uplink communication signals 36 are representative of communication of signals between the network infrastructure 16 and the mobile station. And, during operation of the third communication system, communication signals are transceived between the network infrastructure 18 and the mobile station. Here, third downlink signals 38 and third uplink communication signals 42 are representative of signals communicated during operation of the third communication system.

During operation of any of the three communication systems, a communication path is formable between the mobile station 12 and the emergency dispatch center 24 by way of an appropriate radio link, with an appropriate one of the infrastructures 14–18, and the PSTN 22.

The mobile station 12 is here shown to include transmitter circuitry 44 and receiver circuitry 46, each connected to an antenna transducer 48. The transmitter and receiver circuitry are each operable, generally, in conventional manner to transmit and to receive communication signals generated during operation of any of the communication systems of the communication arrangement 10. The mobile station further includes, pursuant to an embodiment of the present invention, apparatus 50 of an embodiment of the present invention. The apparatus 50 facilitates completion of a request for emergency assistance indicated by entry of digits forming a dialing pattern associated with the emergency dispatch center 24 entered by a user of the mobile station 12. In the United States, for instance, the digits 9-1-1 are sometimes utilized as a generic emergency calling pattern. In some mobile stations, entry of a particular actuation key is interpreted by the mobile station as a request for emergency assistance, and such entry causes dialing of the appropriate digits to form a connection with the emergency dispatch center.

The apparatus 50 includes functional elements whose functionality, in the exemplary implementation, are carried out by algorithms executable by processing circuitry. The apparatus is here shown to include a selector 52, a determiner 54, and an attemptor 56. And, the selector is coupled to a user interface 58, here including an actuation keypad including actuation keys actuable by a user of the mobile station.

The apparatus 50 is operable pursuant to an embodiment of the present invention to facilitate effectuation of a call placed at the mobile station to the emergency dispatch center. Initiation of the call to the emergency dispatch center is made responsive to appropriate user actuation of the user interface 58.

Initially, if the mobile station is associated with a presently-acquired communication system, i.e., here, a selected one of the infrastructures 14, 16, and 18, the call is placed by way of the presently-acquired system. If the call is successfully completed, i.e., a connection is made between the mobile station 12 and the emergency dispatch center, the request for emergency assistance is carried out in conventional manner.

If, conversely, the call is not successfully completed, operation of an embodiment of the present invention initiates actions to further attempt to form the communication connection with the emergency dispatch center. Here, the determiner 54 is coupled to the receive circuitry 46 and is operable to determine whether a connection between the mobile station 12 and the emergency dispatch center has been completed. Determinations are made responsive to indications of messaging, or the lack thereof, by way of the radio links formed with the mobile station. If a determination is made that the connection has not been made, an indication is provided to the selector 52. The selector is operable to select in what manner to attempt to complete the call to the emergency dispatch center. The selector is selectably operable to cause the attemptor 56 to attempt again to place the call to the emergency dispatch center by way of the same communication system that the earlier attempt, or attempts, had been made. Or, the selector is operable to select another communication system by which to cause the attemptor 56 to attempt to complete the emergency call to the dispatch center. Responsive to selections made by the selector 52, the attemptor causes the transmit circuitry to send the appropriate signals to the appropriate network infrastructure 14–18 to complete the call to the emergency dispatch center.

In conventional manner, paging, or other channels, are defined in the respective communication systems upon which to place the call to the emergency dispatch center. The selector selects the channels upon which to cause the transmit circuitry to generate the signaling to initiate, and thereafter complete, the call to the emergency dispatch center. Selection of multiple attempts by way of a particular communication system, prior to switching to another communication system by which to attempt to place the emergency call, in one implementation, is dependent upon the time period within which prior attempts have been made. Excessive amounts of time are thereby not permitted to elapse prior to switching to an attempt in another of the communication systems. And, when the selector selects another communication system by which to attempt to complete the emergency call, selection of the alternate communication system is made pursuant to a system selection algorithm.

If the call is terminated by the user prior to its completion or if power is lost at the mobile station, the attempt to complete the emergency phone call, in the exemplary implementation, is aborted. That is to say, the call is released or dropped. Once the call is released or dropped, subsequent operation of the mobile station attempts to acquire the most-recently utilized communication system. And, if the most-recently utilized communication system is not available, the next available system is utilized and acquired, if possible. Further, in the exemplary implementation, the user interface also includes a user display upon which indications of the status of the call are indicated.

Figure 2:
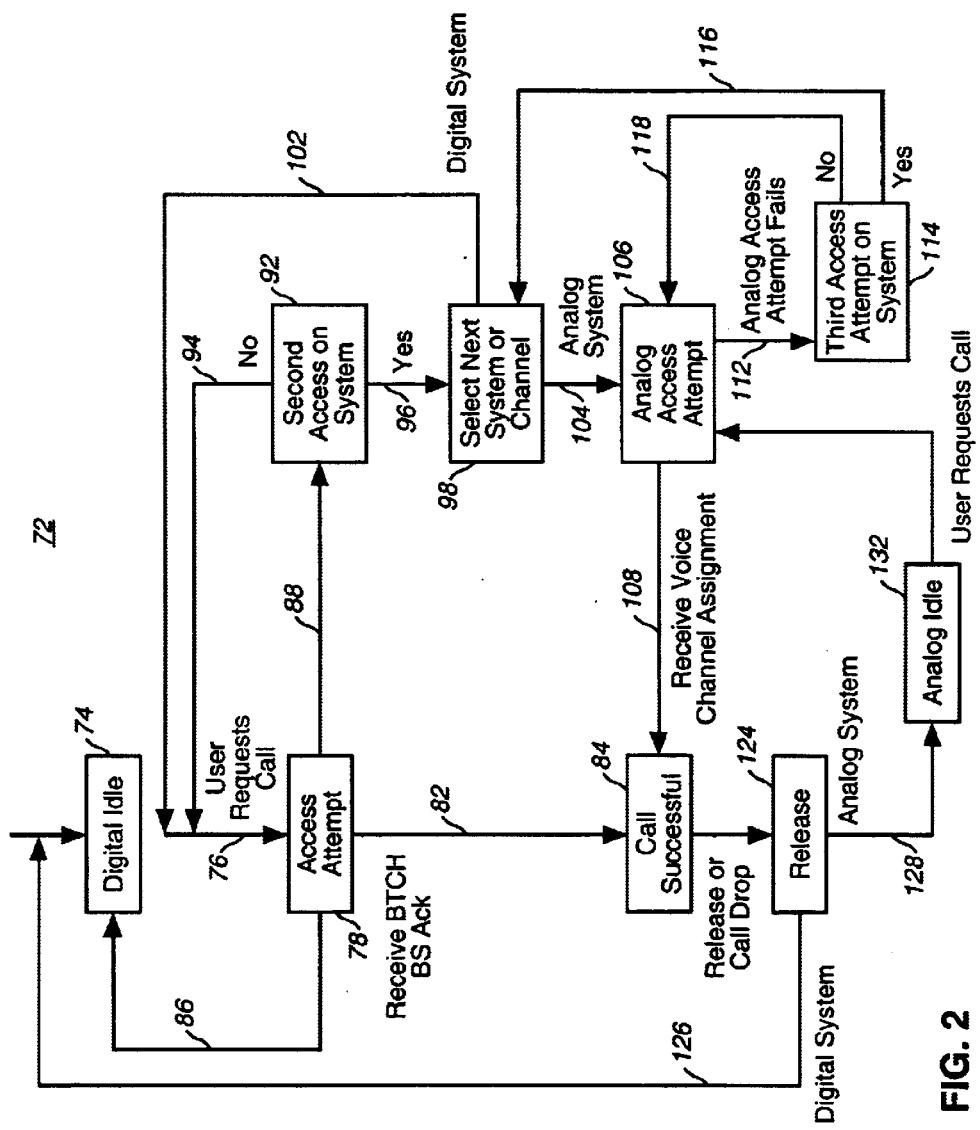
FIG. 2 illustrates a method flow diagram illustrating the method of operation of the mobile station shown in FIG. 1 during operation of an embodiment of the present invention.

FIG. 2 illustrates a method, shown generally at 72, representative of operation of the mobile station shown in FIG. 1. The method 72 represents operation of the mobile station when the first communication system and the associated network infrastructure 14 thereof is potentially available and the second communication system, and the network infrastructure 18 thereof, is also potentially available. Here, the first communication system is the presently-acquired system, and the mobile station is in the idle mode, indicated by the block 74. The line 76 indicates that the user requests a call to be made to the emergency dispatch center 24 (shown in FIG. 1). And, an attempt to place the call is made, indicated by the access attempt block 78.

If the attempt is successful, a DTCH VS acknowledgment signal, indicated on the line 82, is returned to the mobile station, and upon determination of detection of such a signal, the emergency call is concluded to be successful, indicated by the block 84. The line 86 returns to the digital idle block 74, and the line 88 extends to the block 92, here representative of a second attempt to access the emergency dispatcher through the presently-acquired communication system. A no branch 94 returns to the line 76, and the yes branch 96 extends to the block 98.

The block 98 is representative of selection of an alternate communication system to be utilized or an alternate channel on the presently acquired communication system upon which to reattempt the emergency call. The line 102 is representative of selection to reattempt completion of the emergency call by way of the presently-acquired system, here, again, the first communication system. And, the line 104 is representative of selection at the block 98 to attempt to complete the emergency call by way of the second communication system, here an analog communication system. The block 106 is representative of the attempt to complete the emergency call by way of the second communication system. The line 108 is representative of detection at the mobile station of a voice channel assignment provided to the mobile station indicating that the call is successful, again represented by the block 84.

The line 112 is representative of failure to complete the emergency call responsive to the attempt at the block 106. And, the block 114 is representative of a subsequent attempt to complete the emergency call to the emergency dispatch center. The yes and no branches 116 and 118, respectively, return to the blocks 98 and 106 for operations to be performed thereat.

Upon completion of the call, indicated at the block 84, the call is subsequently released, indicated by the block 124. Thereafter, an appropriate path 126 or 128 is taken to return the mobile station to the appropriate idle mode, in either the digital idle mode indicated by the block 74 or the analog idle mode indicated by the block 132.

In one exemplary implementation, a system selection for preferred roaming algorithm is provided and utilizes procedures described in an existing TIA/EIAIS683-A standard in which a preferred roaming list is utilized. The preferred roaming list indicates which systems are preferred systems for use by the mobile station. The preferred roaming list also indicates which systems should not be used by the mobile station, also referred to as negative systems. The preferred roaming list further includes information to facilitate a reduction in acquisition time in the completion of the emergency call to the emergency dispatch center. In the exemplary implementation, the preferred roaming list includes two tables, an acquisition table and a system table. The acquisition table contains a list of acquisition records that provides, e.g., the band and frequency information that the mobile station is to utilize when attempting to communicate pursuant to a selected communication system. The records are listed in priority order, such as highest-priority first, according to the desired mobile station system selection scanning priorities. The system table contains a list of system records. Each record identifies, e.g., a system by its system or network identifier (SID and NID). For each record, there is an indicator of whether the system is a preferred or negative system, the roaming status that should be indicated by the mobile station associated therewith, the relative priority of the system, and its geographical region. Each record also preferably contains an acquisition index which indicates a record in the acquisition table which is to be used.

Figure 3:
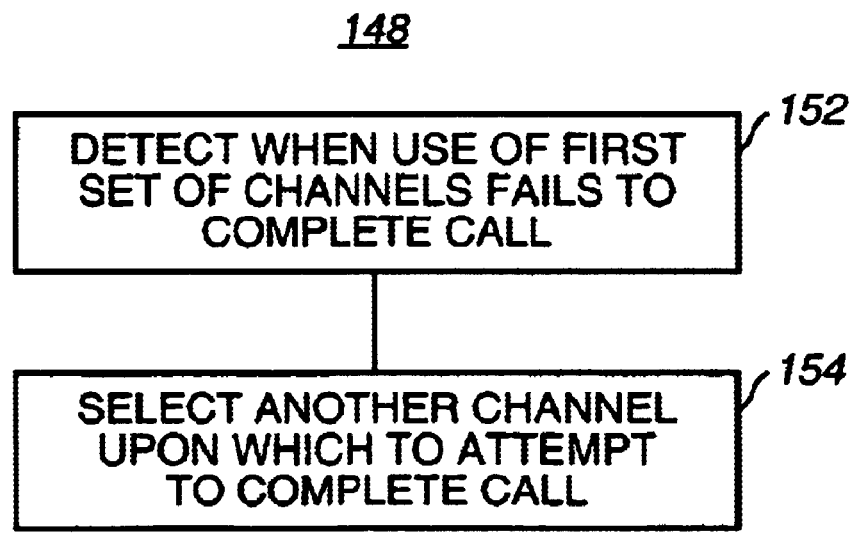
FIG. 3 illustrates a method flow diagram listing the method steps of the method of operation of an embodiment of the present invention.

FIG. 3 illustrates a method, shown generally at 148, of an embodiment of the present invention. The method is operable to facilitate completion of an emergency call placed at a mobile station. The mobile station is operable in a first radio communication system in which a first set of channels are utilized in placement of the emergency call and is operable in at least a second radio communication system in which at least a second set of channels is utilized in placement of the emergency call. A preferred list of channels is selected from at least one of the first set and the second set utilized by the mobile station first to attempt the completion of the emergency call.

First, and as indicated by the block 152, detection is made of when utilization of the preferred list of channels fails to complete the emergency call. Then, and as indicated by the block 154, a selection is made, responsive to such detection, of failure of completion of the emergency call, of at least one additional channel to be utilized by the mobile station to attempt the completion of the emergency call.

Thereby, a manner is provided by which to place an emergency call utilizing a radio communication system. If an emergency call is unable to be completed by way of one of the communication systems, attempts are made to place the call by way of another communication system in which the mobile station is operable. The likelihood that an emergency call might not be able to be completed is thereby reduced by increasing the communication systems in which the call is attempted.

The previous descriptions are of preferred examples for implementing the invention, and the scope of the invention should not be necessarily be limited by this description. The scope of the present invention is defined by the following claims.

I claim:

1. Apparatus for facilitating completion of an emergency call placed at a mobile station by a user, the mobile station being operable in a first radio communication system in which a first set of channels are utilized in placement of the emergency call and the mobile station being operable in at least a second radio communication system in which at least a second set of channels are utilized in placement of the emergency call, a preferred list of channels selected from at least one of the first set and the second set, utilized by the mobile station first to attempt the completion of the emergency call, said apparatus comprising:

a determiner coupled to receive indications of attempts to complete the emergency call, said determiner for determining whether a prior attempt to complete the emergency call was successful;

a selector coupled to said determiner at least to receive indications of determinations made by said determiner of non-successful completion of the emergency call through utilization of the preferred list of channels, said selector operable responsive thereto to select at least one additional channel to be utilized by the mobile station to attempt the completion of the emergency call, the at least one additional channel selected from the first set and the second set and which is not contained in the preferred list of channels; and a call attemptor coupled to said selector, said call attemptor being operable responsive to selection made by said selector, said call attemptor for initiating placement of the emergency call responsive to the selection made by said selector and, subsequent to a user-caused, call-attempt termination, for attempting to acquire a most-recently utilized communication system of the first and at least second radio communication systems.

2. The apparatus of claim 1 wherein a selected one of the first radio communication system and the second radio communication system comprises a presently-acquired communication system with respect to the mobile station, wherein the preferred list of channels comprises the set of channels associated with the presently-acquired communication system, and wherein said selector is suitable for selecting the at least one additional channel associated with an other-than presently-acquired communication system.

3. The apparatus of claim 1 wherein said determining is further operable to determine whether the attempt to complete the emergency call through utilization of the at least one additional channel is successful.

4. The apparatus of claim 1 wherein said call attemptor is operable to re-attempt placement of the emergency call a selected number of times responsive to determination by said determiner of unsuccessful completion of the emergency call.

5. The apparatus of claim 4 wherein said call attemptor is suitable for initiating placement of the emergency call upon a selected one of the at least one additional channel selected by said selector for the selected number of times responsive to the determination by said determiner of the unsuccessful completion of the emergency call.

6. The apparatus of claim 5 wherein said determiner is suitable for making a determination subsequent to each call attempt attempted by said call attemptor.

7. The apparatus of claim 5 wherein the selected number of times at which said call attemptor is suitable for initiating placement of the emergency call in selected responsive to an allowable time period within which the emergency call must be placed.

8. The apparatus of claim 1 wherein the at least the second radio communication system having the at least the second set of channels in which the mobile station is operable comprises the second communication system and at least a third communication system, the third communication system having a third set of channels utilizable in the placement of the emergency call, one of the first communication system and the second communication system forming a more-preferred system, and wherein said selector is suitable for first selecting the at least one additional channel from the set of the more-preferred system to be utilized by the mobile station to attempt the completion of the emergency call.

9. The apparatus of claim 8 wherein said selector is suitable for subsequently selecting the at least one additional channel selected from the set of an other-than-the-more-preferred system to be utilized by the mobile station to attempt the completion of the emergency call subsequent to failure earlier to complete the emergency call.

10. The apparatus of claim 1 wherein the first radio communication system is operated by a first operator with which the mobile station is operable pursuant to a service subscription, wherein the second radio communication system is operated by a second operator, wherein the preferred list of channels are associated with the first radio communication system, and wherein the at least one additional channel selected by said selector is associated with the second radio communication system.

11. The apparatus of claim 1 further comprising a memory device having a memory table stored thereat, the memory table containing the preferred list of channels from which said selector is suitable for selecting the at least one additional channel.

12. A method for facilitating completion of an emergency call placed at a mobile station, the mobile station being operable in a first radio communication system in which a first set of channels are utilized in placement of the emergency call and the mobile station operable in at least a second radio communication system in which at least a second set of channels is utilized in placement of the emergency call, a preferred list of channels selected from at least one of the first set and the second set, utilized by the mobile station first to attempt the completion of the emergency call, said method comprising:

determining whether a prior attempt to complete the emergency call was successful through utilization of the preferred list of channels;

selecting, responsive to determination during said operation of determining, of non-success of the prior attempt to complete the emergency call through utilization of the preferred list of channels, at least one additional channel to be utilized by the mobile station to attempt the completion of the emergency call, the at least one additional channel selected from the first set and the second set and which is not contained in the preferred list of channels; and attempting, responsive to selection made during said operation of selecting, initiation of placement of the emergency call, and attempting, subsequent to a user-caused, call-attempt termination, to acquire a most-recently utilized communication system of the first and at least second radio communication systems.

13. The method of claim 12 wherein a selected one of the first radio communication system and the second radio communication system comprises a presently-acquired communication system with respect to the mobile station wherein the preferred list of channels comprises the set of channels associated with the presently-acquired communication system, and wherein the at least one additional channel selected during said operation of selecting is associated with an other-than-presently-acquired communication system.

14. The method of claim 12 wherein said operation of attempting further comprises the operation of re-attempting to complete the emergency call if a determination is made during said operation of determining of non-successful completion of the emergency call.

15. The method of claim 14 wherein said operations of determining and attempting are repeated a selected number of times.

16. The method of claim 15 wherein the selected number of times at which said operations of determining and re-attempting are repeated is dependent upon time periods required to perform said operations of determining and attempting.

* * * * *